United States Patent [19]

Cyron

[11] Patent Number: 4,719,680

[45] Date of Patent: Jan. 19, 1988

[54] METHOD FOR MANUFACTURING A WOUND METALLIC EXHAUST GAS CATALYST CARRIER BODY HAVING A GEOMETRICALLY COMPLEX CROSS-SECTIONAL SHAPE

[75] Inventor: Theodor Cyron, Bergisch Gladbach, Fed. Rep. of Germany

[73] Assignee: Interatom GmbH, Bergisch Gladbach, Fed. Rep. of Germany

[21] Appl. No.: 891,116

[22] Filed: Jul. 28, 1986

[30] Foreign Application Priority Data

Jul. 29, 1985 [DE] Fed. Rep. of Germany ....... 3527111

[51] Int. Cl.$^4$ ............................................. B21D 53/00
[52] U.S. Cl. .................................... 29/157 R; 29/428; 422/180; 428/116; 428/593; 502/439; 502/527
[58] Field of Search ............. 29/157 R, 428; 422/180, 422/177; 428/116, 593; 502/527, 439

[56] References Cited

U.S. PATENT DOCUMENTS 4,186,172  1/1980  Scholz ......................... 29/157 R X
4,220,625  9/1980  Toh et al. ............................ 422/180
4,381,590  5/1983  Nonnenmann et al. .......... 29/157 R

FOREIGN PATENT DOCUMENTS 2302746  7/1974  Fed. Rep. of Germany .
2250569  6/1975  France .
2072064  9/1981  United Kingdom .
2079174  1/1982  United Kingdom .

Primary Examiner—Howard N. Goldberg
Assistant Examiner—Ronald S. Wallace
Attorney, Agent, or Firm—Herbert L. Lerner; Laurence A. Greenberg

[57] ABSTRACT

A method of producing a metallic exhaust gas catalyst carrier body includes winding alternating layers of smooth and corrugated sheetmetal strips to form a blank and inserting the blank into a jacket tube, each winding of the blank being formed of a respective smooth and corrugated sheetmetal strip each having an individually predeterminable length; determining the length of each winding in accordance with the length necessary for filling a predetermined jacket tube cross section, fixing each winding beforehand to at least one side of the blank, so as to produce an approximately egg-shaped blank which is tightly wound on the one side and wound with varying looseness in the remaining region thereof; inserting the blank into the jacket tube in such a manner that the tightly wound side is located in a region of the jacket tube cross section in which a largest possible inscribed circle of the jacket tube cross section engages the jacket tube, and a device for carrying out the method, a carrier body formed by the method and device, and a blank forming part of the carrier body.

5 Claims, 9 Drawing Figures

METHOD FOR MANUFACTURING A WOUND METALLIC EXHAUST GAS CATALYST CARRIER BODY HAVING A GEOMETRICALLY COMPLEX CROSS-SECTIONAL SHAPE

The invention relates to a wound metallic exhaust gas catalyst carrier body with a geometrically complex cross-sectional shape and a method as well as a device and a blank for producing the carrier body.

A wound metallic exhaust gas catalyst carrier body, a method and device for producing such a carrier body have become known heretofore from German Published Prosecuted Application (DE-A) No. 23 02 746.

Exhaust gas catalyst carrier bodies, especially in the case of passenger motor vehicles, are generally arranged below the bottom tray of the vehicle, whereat, however, only a limited amount of space is available because of required ground clearance. It is thereby desirable not to produce any cylindrical exhaust gas catalyst carrier bodies, but rather, flatter exhaust gas catalyst carrier bodies with a shape better adapted to the specific situation. In wound catalyst carrier bodies, however, this encounters considerable difficulties in production. As explained hereinafter in detail with reference to the drawing, it is very easy to produce rotationally-symmetrical or axially-symmetrical spirally wound catalyst carrier bodies, and also flatter shapes, which can be obtained by compressing a spirally wound hollow cylinder, also present no problems. All other shapes, however, which cannot be produced directly in this manner (generally called complex cross sections hereinafter) cannot be produced with conventional winding devices.

It is an object of the invention therefore, to produce a wound metallic exhaust gas catalyst carrier body with a geometrically complex cross-sectional shape in order to achieve a better adaptation to the spatial conditions under the bottom tray of a motor vehicle. The method of production and, as far as possible, the corresponding production device, should be equally well suited for varying complex cross sections.

With the foregoing and other objects in view, there is provided, in accordance with the invention, a method of producing a metallic exhaust gas catalyst carrier body, which comprises winding alternating layers of smooth and corrugated sheetmetal strips to form a blank and inserting the blank into a Jacket tube, each winding of the blank being formed of a respective smooth and corrugated sheetmetal strip each having an individually predeterminable length; determining the length of each winding in accordance with the length necessary for filling a predetermined jacket tube cross section, fixing each winding beforehand to at least one side of the blank, so as to produce an approximately egg-shaped blank which is tightly wound on the one side and wound with varying looseness in the remaining region thereof; inserting the blank into the jacket tube in such a manner that the tightly wound side is located in a region of the jacket tube cross section in which a largest possible inscribed circle of the jacket tube cross section engages the jacket tube.

As is explained hereinafter with reference to the drawing in greater detail, more complex cross sections can no longer be filled out by elastic deformation of hollow-cylindrical spiral-shaped windings of smooth or corrugated sheet metal strips. It has been found, however, that irregular shapes can also be filled out by a wound blank if this blank is not wound firmly but is formed, at least partially, of loosely wound windings which, however, are connected together on one side point-wise for stabilizing the blank, so that a tighter wound region is produced there. For each cross-sectional area which has no tightly wound location, measurements or calculations may be made as to how long each individual turn must be so that a jacket tube with this cross-sectional area can be filled out completely by closely adjacent corrugated and smooth sheetmetal strips.

In accordance with another mode of the invention, the cross-sectional area of the jacket tube is formed with at least one constriction or has an especially complex geometry, which includes subdividing the cross-sectional area into areas of relatively simpler shape, forming blanks for these simpler cross-sectional areas, and inserting the thus formed blanks successively or simultaneously into the jacket tube. Either straps or strips can be provided in the jacket tube for affecting the subdivision or a "fictitious" subdivision can be made, upon which the dimensions of the blanks can then be based, and which is then actually formed by the boundary surfaces of the individual blanks when they are inserted into the jacket tube.

In accordance with a further aspect of the invention, a blank is provided for producing a metallic exhaust gas catalyst carrier body wound from alternatingly smooth and corrugated sheetmetal strips, individual windings of the blank deviating at least partly from an ideal, tightly wound spiral shape by being longer than would be necessary for a tightly wound spiral; successive windings of the blank being fixed beforehand to one side of the blank, so that one side of the blank is tightly wound and the remaining region of the blank is at least partly wound loosely. In addition, successive windings are tacked together on one side of the blank, preferably spot-welded, so that one side of the blank is wound tightly and the remaining region loosely, at least in part. Spot welding on one side prevents the blank from unwinding to form a hollow-cylindrical spiral shape when the blank is handled.

In accordance with an alternative additional feature of the invention, two possibilities for arranging the individual windings are provided, namely, on the one hand, windings with a smooth layer on the outside and, on the other hand, windings with a corrugated layer on the outside. Both of these possibilities have different advantages and disadvantages which manifest themselves in conventional manner during the later handling and fastening in the jacket tube.

In accordance with an additional feature of the invention, the metallic wound exhaust gas catalyst carrier body is formed of wound alternating layers of smooth and corrugated sheetmetal strips and surrounded by a jacket tube, the jacket tube having a geometrically complex cross section; the exhaust gas catalyst carrier body wound from the smooth and corrugated sheetmetal strips filling out the cross section of the jacket tube in such a manner as if it had been wound tightly from the outside inwardly; the winding having a center disposed in vicinity of the center of the largest circle which can be inscribed within the cross section. In this regard it is noted that winding the carrier body tightly from the outside inwardly is neither possible technically nor economically. The beginning and the end, respectively, of the sheet metal strips are thereby disposed approximately in the center of the inscribed circle. In general, such an exhaust gas catalyst carrier body is subjected also to a joining treatment, after being inserted into the jacket tube, in which for example, the corrugated and the smooth sheet metal strips are soldered together.

In accordance with an added feature of the invention, the cross-sectional area predetermined by the jacket tube is subdivided into more simply shaped subareas which are filled out with smooth and corrugated sheet-metal. Thus, the especially complex cross-sectional area of the jacket tube is densely or tightly filled with several blanks.

In accordance with yet another feature of the invention, the means for feeding the winding sections comprise a telescopic arm formed with a joint and a gripping or magnet head.

In accordance with yet a further feature of the invention, the pointwise fixing means is a spot-welding device which is integrated into the gripping or magnet head.

In accordance with a concomitant feature of the invention, there is provided a programmable control unit for controlling the winding device and the means for feeding the varying lengths of winding sections of the strips.

The desired properties of the individual windings cannot be achieved merely by winding, so that additional means for precisely arranging the individual windings together must be provided. The last-mentioned features accordingly provide additional advantages in accordance with the device of the invention.

Other features which are considered as characteristic for the invention are set forth in the appended claims.

Although the invention is illustrated and described herein as embodied in a wound metallic exhaust gas catalyst carrier body having a geometrically complex cross-sectional shape, and method, apparatus and blank for producing the body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
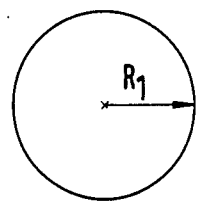
FIGS. 1 and 2 are cross-sectional views of exhaust gas catalyst carrier bodies that are relatively easy to make.

Referring now to the drawing and, first, particularly to FIG. 1 thereof, there is shown a conventional spirally wound catalyst carrier body having a circular cross section with a radius R, which is the relatively easiest to fabricate.

Figure 2:
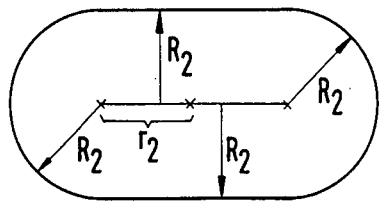

Also the cross section shown in FIG. 2 can be produced relatively easily by conventional methods, namely, by compressing a spirally wound hollow cylinder with a winding-free inner circle having the radius $r_{2/\pi}$ and a tightly wound hollow-cylindrical ring having a thickness $R_2$.

Figure 3:
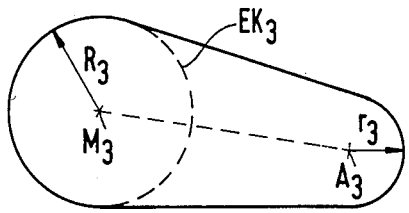
FIGS. 3, 4 and 5 are cross-sectional views of relatively more complicated exhaust gas catalyst carrier bodies which can be made only by the method according to the invention of the instant application.
Figure 4:
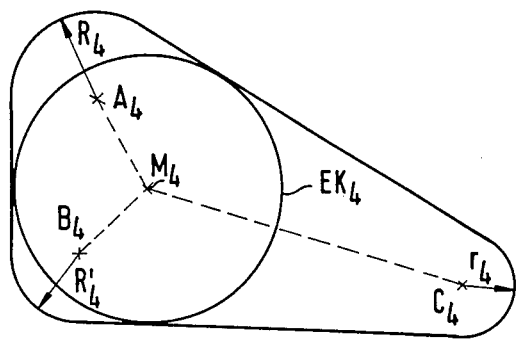
Figure 5:
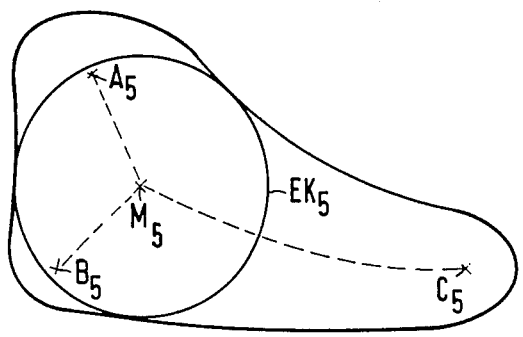

In FIGS. 3, 4 and 5, increasingly more complicated cross sections for exhaust gas catalyst carrier bodies are shown. The three phases thus shown in FIGS. 3 to 5 serve as examples of shapes which can be realized with the method according to the invention. Such wedge shapes with rounded corners or modifications generated therefrom by slight deformation of the sides thereof cannot be produced by conventional means, i.e., by winding. While methods have been proposed which amount to stacking of sheetmetal strip sections cut to length or bent in a meandering or sinuous manner, there methods are very costly and require complex manufacturing devices.

Figure 7:
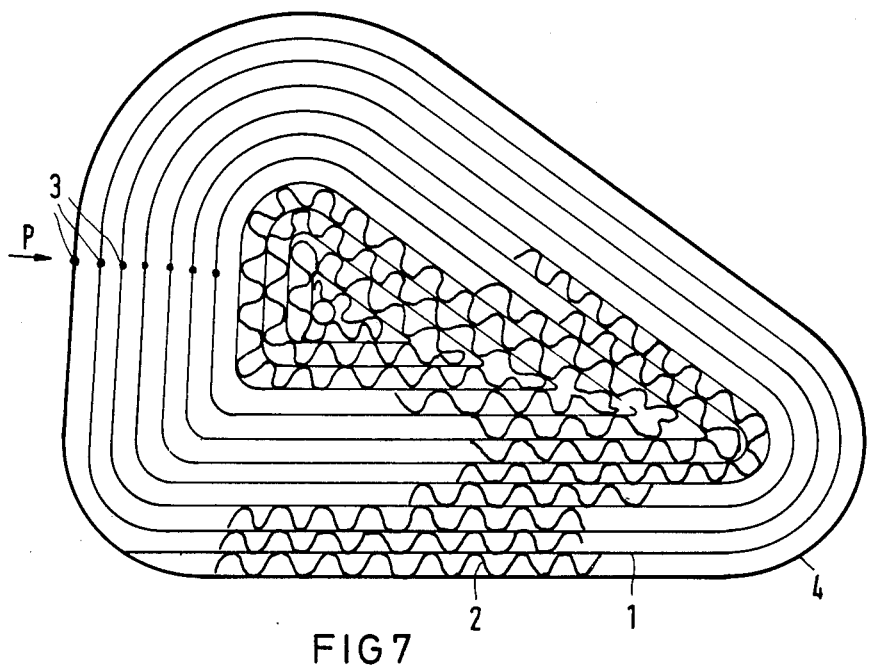
FIG. 7 is an embodiment according to the invention of a completed catalyst carrier body having a relatively more complicated cross section.

As may be concluded by way of example from FIG. 7, more or less irregular wedge shapes, however, are able to be filled out purely in principle by windings of smooth or corrugated sheetmetal strips. This is theoretically apparent best if one starts to fill such a cross-sectional area with windings from the outside towards the inside. Unfortunately, such a manufacturing method cannot be realized technically at justifiable cost. Theoretical considerations show, however, that for every such cross-sectional shape, there must be a suitable blank which can be pre-formed and can be introduced through a suitable insertion device into a jacket tube of the respective cross-sectional area, so that it fills out the latter exactly.

It has been found that a blank for such cross-sectional areas must not be wound tightly spirally, but that the length of every individual turn must be selected in accordance with the planned subsequent cross-sectional shape. A suitable blank must therefore be wound loosely at least in partial regions, i.e., with gaps between the individual layers of sheetmetal. In order that such a blank does not spring apart so as to form a hollow cylinder during handling, each turn, after a full revolution, must be fixed beforehand relative to the preceding layer, for example, by spot-welding or similar joining method or by a temporary holding device. In this manner, an eccentric or irregular egg-shaped blank is then produced which is suited respectively for a very definite family of cross-sectional shapes.

Several other properties which may be helpful for an understanding of the invention, are explained hereinafter with reference to FIGS. 3 to 7. Each of the irregular wedge shapes has a maximum inscribed circle. In FIG. 3, this is the circle $EK_3$ with a radius $R_3$ about a point $M_3$. The circle $EK_3$ coincides partially with the boundary of the cross-sectional area. In FIG. 4, the inscribed circle is a circle $EK_4$ about a center $M_4$ which touches or tangentially engages the peripheral boundary line of the cross-sectional area at three points. Correspondingly, the largest possible inscribed circle in FIG. 5 is a circle $EK_5$ about a center $M_5$. This inscribed circle $EK_5$ has special significance for the invention of the instant application, because the tightly wound, previously fixed side P of a blank (note FIG. 6), upon insertion into a jacket tube, can lie approximately only in that region in which the inscribed circle touches the peripheral line. Otherwise, there would be a danger of excessively large deformation forces on the punctiform or spot connections and, respectively, the given cross-sectional area could not be filled with the blank without any problems.

In FIGS. 3 and 4, it is assumed that the rounded corners of the wedge shape have given radii of curvature. In FIG. 3, the one corner has a radius of curvature $R_3$ and the other corner is part of a circle drawn about the point $A_3$ with the radius $r_3$. A blank for such a shape has, in the inner region thereof, relatively loose turns with substantially equal spacings therebetween, while it must have, in the outer region thereof, a layer of firm windings with a thickness $r_3$.

More complex are the conditions for a cross-sectional area according to FIG. 4, because such a shape calls for three different radii of curvature for the corners, namely $R_4$, $R'_4$ and $r_4$ having centers of curvature $A_4$, $B_4$ and $C_4$, respectively. A corresponding blank must again have, in the outer region thereof, a closely wound layer with a thickness $r_4$, however, the lengths of the turns must be determined by measurement or calculation.

For quite irregular shapes such as is shown in FIG. 5, the shape of the blank can be described only by defining the length of all of the individual turns. These can be determined, however, by calculation or by trial and error.

Figure 6:
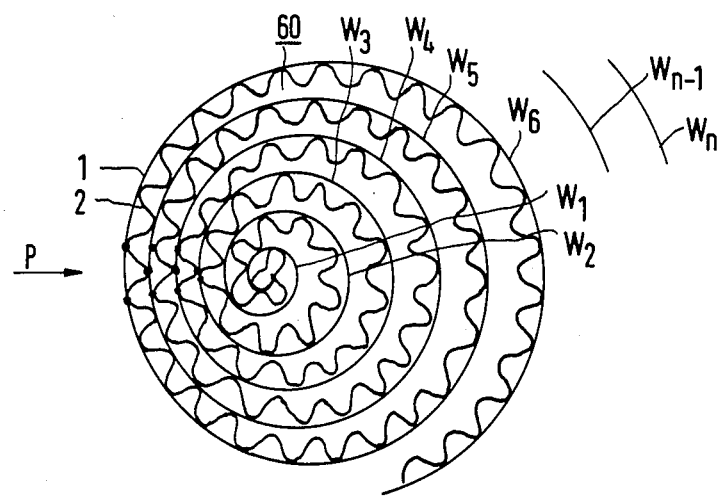
FIG. 6 is a diagrammatic view of a blank.

As is shown by way of example in FIG. 7, given bending lines are produced when a jacket tube is filled with blanks. These extend, as indicated in FIGS. 3 to 5 by broken lines, along definite lines from the centers of curvature of the corners approximately to the center of the inscribed circle. In the case of irregular shapes as in FIG. 5, these do not necessarily lie on straight lines, but rather along an optionally curved center line between the adjoining peripheral lines such as are indicated for the line sections $M_5A_5$, $M_5B_5$, and $M_5C_5$, FIG. 6 shows in a diagrammatic view the innermost turns $W_1$, $W_2$, $W_3$ ... $W_{n-1}$, $W_n$ of a blank according to the invention. The latter consists at least partially of loosely wound turns, each of which is formed of a smooth sheetmetal strip 1 and a corrugated sheetmetal strip 2. The smooth sheetmetal strip 1 of a turn can lie on the outside as well as on the inside. On the side P of the blank, the individual turns have been fixed beforehand against displacement, preferably spot-welded at 3 in a small region. The entire blank 60 has an eccentric shape matched to the subsequent cross-sectional shape which is planned. In partial regions thereof, especially in the outer region, the blank 60 may also have tightly wound turns.

FIG. 7 shows the already completed exhaust gas catalyst carrier with an approximately wedge-shaped cross-sectional area. The smooth sheetmetal strip 1 and the corrugated sheet metal strip 2 now lie closely together in the final form thereof inside the jacket tube 4, so that the planned channels between the individual layers are formed without any excessively large openings being left over anywhere. In the region P, in which the inscribed circle engages the jacket tube 4 (note also FIGS. 4 and 5), the connecting points 3 formed during the manufacture of the blank are located.

Figure 8:
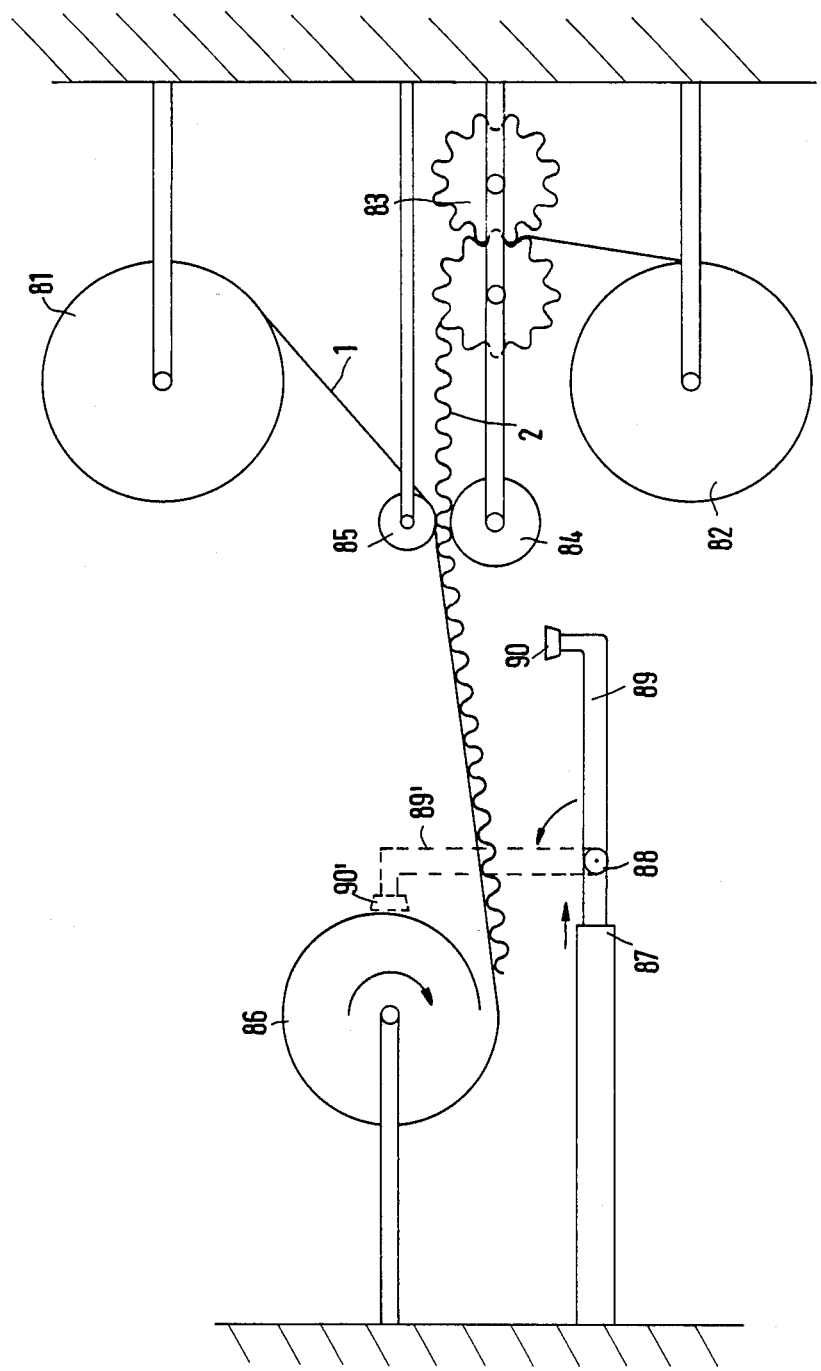
FIG. 8 is a diagrammatic elevational view of apparatus for manufacturing a blank according to the invention.

FIG. 8 is a diagrammatic view of a modified winding device which permits the measurement of different turn lengths. Two supply reels 81 and 82 initially contain smooth sheetmetal strips. In a corrugating device 83, the one sheetmetal strip from the reel 82 is corrugated and, via deflection rolls 84 and 85, the smooth sheetmetal strip 1 and the corrugated sheetmetal strip 2 are fed to a winding device 86. This winding device 86, however, does not, as in the conventional methods, simply wind up both sheetmetal strips in spiral fashion, but rather cooperates with a telescopic arm 87, 89. This telescopic arm 87, 89 has a joint 88 and a gripper or magnet head 90.

The operating cycle of the device includes the following steps successively or simultaneously: The winding device 86 rotates through 360°. The telescopic arm 87, 89 extends out to the length necessary for the next winding and folds at the joint 88 against the oncoming sheetmetal strips 1 and 2 and, with the latter, against the previously wound part of the blank into the position 89'; 90'. The head 90 of the telescopic arm 87, 89 has a gripping or magnetic device by which the sheetmetal strips 1 and 2 can be held at the desired point and can be moved towards the winding device 86. Preferably, a spot welding device is also integrated in the head 90 which permits the individual turns to be tacked or secured to the respective preceding layer. The telescopic arm 87, 89 and the winding device 86 are preferably addressable by a conventional programmable control, so that respectively prescribed and stored lengths can be placed successively on the winding device 86.

Figure 9:
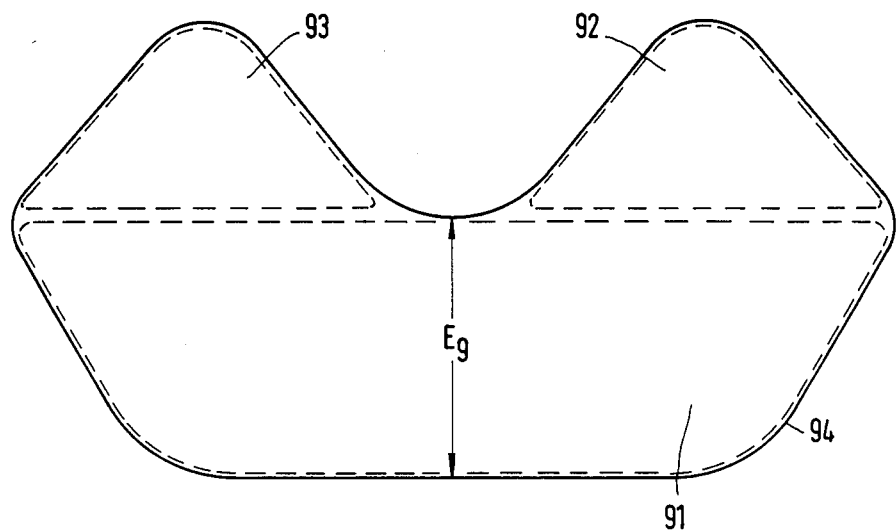
FIG. 9 is a cross-sectional view of an especially complicated exhaust gas catalyst carrier body which can be produced by the method according to the invention only after subdivision into relatively simpler cross-sectional areas.

In FIG. 9, finally, there is further shown a cross-sectional shape of an exhaust gas catalyst carrier body which cannot be made readily by the aforedescribed method because it has a constriction $E_9$. Such complicated cross-sectional areas, however, can generally be divided into now simply shaped areas 91, 92 and 93 which can be filled out with blanks according to the method of the invention. The most advantageous type of subdivision depends upon the specific shape and the other boundary conditions for economical production.

The invention of the instant application affords the production of exhaust gas catalyst carrier bodies of smooth and corrugated sheetmetal for cross sections of almost any desired shape. This facilitates the installation thereof under the bottom tray of motor vehicles and, if necessary or desirable, retrofitting therewith under existing spatial conditions.

We claim:

1. Method of producing a metallic exhaust gas catalyst carrier body, which comprises winding alternating layers of smooth and corrugated sheet metal strips to form a blank and inserting the blank into a jacket tube, each winding of the blank being formed of a respective smooth and corrugated sheetmetal strip each having an individually predeterminable length; determining the length of each winding in accordance with the length necessary for filling a predetermined jacket tube cross section, fixing each winding beforehand to at least one side of the blank, so as to produce a blank which is tightly wound on the one side and wound with varying looseness in the remaining region thereof; inserting the blank into the jacket tube in such a manner that the tightly wound side is located in a region of the jacket tube cross section in which a largest possible inscribed circle of the jacket tube cross section engages the jacket tube.

2. Method according to claim 1 wherein the cross-sectional area of the jacket tube is formed with a multiplicity of sides, and which includes subdividing the cross-sectional area into areas having less sides than the multiplicity of sides, forming blanks with cross-sectional areas corresponding to the areas having less sides, and inserting the thus formed blanks into the jacket tube.

3. Method according to claim 1 which includes inserting the blanks successively into the jacket tube.

4. Method according to claim 1 which includes inserting the blanks simultaneously into the jacket tube.

5. Method according to claim 1 wherein the cross-sectional area of the jacket tube is formed with at least one constriction, and the cross-sectional areas of the blanks are formed without any constrictions.

* * * * *